(12) United States Patent
Hagen et al.

(10) Patent No.: US 12,019,162 B2
(45) Date of Patent: Jun. 25, 2024

(54) SURROUNDINGS SENSOR WITH A MOVABLE DEFLECTION APPARATUS FOR MOTOR VEHICLES

(71) Applicant: Covestro Intellectual Property GmbH & Co. KG, Leverkusen (DE)

(72) Inventors: Rainer Hagen, Leverkusen (DE); Thomas Grimm, Cologne (DE); Ulrich Grosser, Kürten (DE); Alexander Meyer, Düsseldorf (DE); Andreas Klein, Leverkusen (DE); Dirk Hinzmann, Pulheim (DE); Peter Capellen, Krefeld (DE); Rafael Oser, Krefeld (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 527 days.

(21) Appl. No.: 17/282,840

(22) PCT Filed: Oct. 4, 2019

(86) PCT No.: PCT/EP2019/076924
§ 371 (c)(1),
(2) Date: Apr. 5, 2021

(87) PCT Pub. No.: WO2020/074392
PCT Pub. Date: Apr. 16, 2020

(65) Prior Publication Data
US 2021/0373170 A1    Dec. 2, 2021

(30) Foreign Application Priority Data
Oct. 10, 2018 (EP) .................................. 18199525

(51) Int. Cl.
*G01S 7/40* (2006.01)
*G01S 7/481* (2006.01)
*G01S 17/931* (2020.01)

(52) U.S. Cl.
CPC .......... *G01S 17/931* (2020.01); *G01S 7/4813* (2013.01); *G01S 7/4814* (2013.01); *G01S 7/4817* (2013.01)

(58) Field of Classification Search
None
See application file for complete search history.

(56) References Cited

U.S. PATENT DOCUMENTS 6,691,003 B1   2/2004   Stortz et al.
7,602,477 B2   10/2009  Nakamura
(Continued)

FOREIGN PATENT DOCUMENTS

DE  102010055113 A1   7/2011
DE  102012112987 B3   12/2013
(Continued)

OTHER PUBLICATIONS

Wolter et al., Applications and requirements for MEMS scanner mirrors (Year: 2005).*
(Continued)

*Primary Examiner* — Elaine Gort
*Assistant Examiner* — Chanmin Park
(74) *Attorney, Agent, or Firm* — John E. Mrozinski, Jr.; Richard P. Bender

(57) ABSTRACT

The invention relates to a sensor system (200, 300) for a vehicle, in particular a motor vehicle, comprising a sensor housing and an active or passive sensor (102) arranged therein, having a sensor technology based on radiation detection and a measurement apparatus assigned to the
(Continued)

Figure 1:
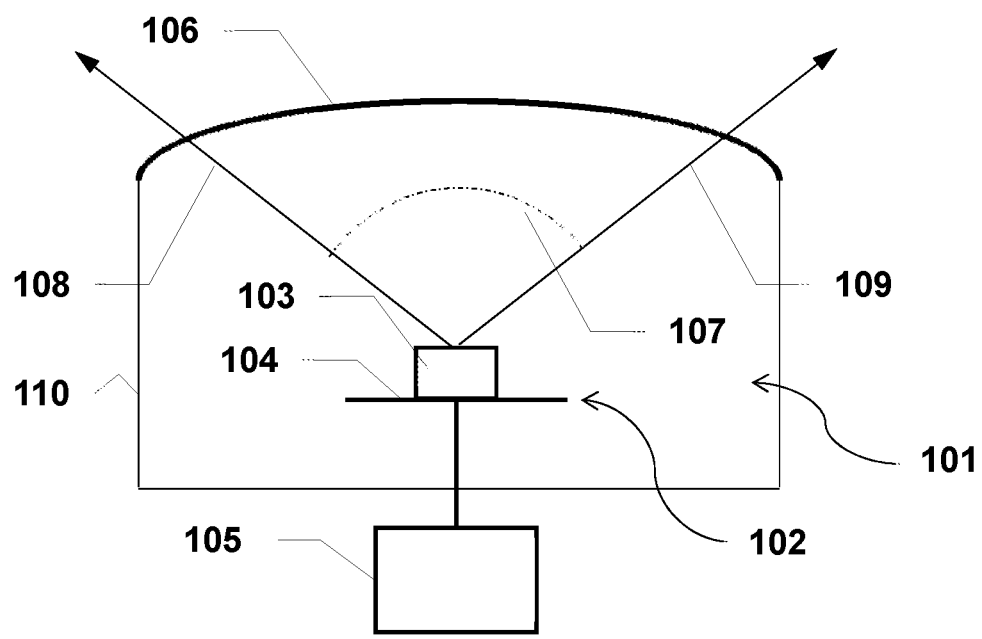

sensor (102), wherein the sensor housing has a cover (106) that is signal-transmissive for the sensor (102) on its side located in the detection direction of the sensor (102), and wherein the detection range of the sensor (102) in the region of the signal-transmissive cover (106) has a lower extent than the signal-transmissive cover (106), wherein the sensor system (200, 300) is characterized in that the sensor (102) is assigned a movable deflection apparatus (201), coupled to a control apparatus, for deflecting the radiation of the sensor (102), wherein the measurement apparatus is designed such that it is suitable for checking, in the detection range of the sensor (102), whether and in which section the signal-transmissive cover (106) has a region with reduced signal transmissivity (203, 302), wherein the measurement apparatus interacts with the control apparatus of the deflection apparatus (201) in such a way that the control apparatus is able to change the position of the deflection apparatus (201) in such a way that the region with reduced signal transmissivity (202, 302) lies outside the detection range of the sensor (102). The invention furthermore relates to a method for operating such a sensor system (200, 300) and to a motor vehicle that is equipped with such a sensor system (200, 300).

17 Claims, 3 Drawing Sheets

(56) References Cited

U.S. PATENT DOCUMENTS

| 2008/0158555 | A1* | 7/2008 | Mori | G01S 17/931 |
| | | | | 356/239.2 |
| 2010/0235129 | A1 | 9/2010 | Sharma et al. | |
| 2015/0090291 | A1 | 4/2015 | Na et al. | |
| 2017/0089829 | A1* | 3/2017 | Bartholomew | G01N 21/255 |
| 2018/0284232 | A1* | 10/2018 | Peters | G01S 7/4813 |
| 2019/0204423 | A1* | 7/2019 | O'Keeffe | G01S 17/89 |
| 2020/0049824 | A1* | 2/2020 | Frederiksen | G01S 7/4813 |
| 2020/0174100 | A1* | 6/2020 | Hori | B60Q 1/0023 |

FOREIGN PATENT DOCUMENTS

| DE | 102013207482 A1 | 10/2014 |
| DE | 102016111615 B3 | 4/2017 |
| JP | 2005329779 A | 12/2005 |
| JP | 2011013135 A | 1/2011 |
| JP | 2016125898 A | 7/2016 |
| JP | 2019219291 A | 12/2019 |
| JP | 2020020709 A | 2/2020 |

OTHER PUBLICATIONS

International Search Report, PCT/EP2019/076924, dated Dec. 13, 2019, Authorized officer: Thomas Zaneboni.

* cited by examiner

SURROUNDINGS SENSOR WITH A MOVABLE DEFLECTION APPARATUS FOR MOTOR VEHICLES

CROSS-REFERENCE TO RELATED APPLICATION

This application is a national stage application under 35 U.S.C. § 371 of PCT/EP2019/076924, filed Oct. 4, 2019, which claims the benefit of European Application No. 18199525.9, filed Oct. 10, 2018, each of which is incorporated herein by reference.

DETAILED DESCRIPTION OF THE INVENTION

The invention relates to a sensor system for a vehicle, in particular a motor vehicle, comprising a sensor housing and an active or passive sensor contained therein with a sensor technology based on radiation detection as well as a measuring device associated with the sensor, wherein the sensor housing has a signal-transmissive cover for the sensor on its side located in the detection direction of the sensor and wherein the detection area of the sensor in the area of the signal-transmissive cover has a smaller extent than the signal-transmissive cover. The invention further relates to a method for operating such a sensor system as well as a motor vehicle which is equipped with such a sensor system.

Driver assistance systems are equipment in motor vehicles designed to increase driving comfort and safety. Advanced driver assistance systems even enable highly automated and autonomous driving. In such semi-autonomous and fully autonomous vehicles, particularly high demands are placed on the function of the environmental sensors. They are based, for example, on digital camera, radar and lidar technology. Cameras are compact optical systems with photocells that capture high-resolution images of the environment. Radar (Radio Detection and Ranging) and Lidar sensors (Light Detection And Ranging), also known as Ladar (Laser Detection and Ranging), together with the cameras and possibly other sensor types, form a digital sensor network based on data fusion and high signal redundancy. Through precise object recognition, object classification and the generation of digital environmental maps in real time, the sensor system makes safe autonomous driving possible in different driving, road, and weather conditions.

Functioning, fail-safe sensors are the basic prerequisite for semi-autonomous and fully autonomous driving. An essential technical task is to maintain the function of the sensor, which sits behind a sensor protection cover that is soiled or damaged by weather and usage effects.

Fouling is caused, for example, by stubborn dust, insects, bird droppings, slush, dried-on dirty water, as well as any kind of particles or liquids swirled up from the road. Fouling can also be caused by dust, as well as any kind of particles or liquids that are stuck to the inside of the sensor protection cover. Damage to the sensor protection cover includes, for example, abrasion, scratches, erosion, cracks, chippings, deformation, swelling, turbidity, and discoloration, either in the flat cover of the body of the pane itself or in at least one of its components, for example lacquer layer, adhesive layer, or decorative element. Fouling and damage cause the electromagnetic waves to be detected by the sensor, as well as the emitted waves (depending on the type of infrared light, radio, or microwave) to be attenuated or deflected by absorption, reflection, or dispersion. This can lead to different faulty sensory behavior, in particular partial to complete signal failure, loss of sensor area, loss of positional resolution, errors in object detection and speed vectoring.

In the prior art, measures are taken to clean dirty sensor covers. Thus, DE 10 2010 055 113 A1 describes a cleaning device with at least one spray nozzle, which sprays a cleaning liquid at high pressure onto at least one of the sensor protection covers and in combination with a heater for the liquid achieves a high cleaning performance even at cold temperatures.

In US 2015/0090291, additional wipers are described, which can clean the pane in front of the sensor.

In DE 10 2013 207 482 A1, heatable surface elements are described, which are used in particular for heating radar covers. By heating up the cover, dirt and coverings of ice and snow can be thawed, and moisture can be reduced, resulting in improved transmissivity of the radar waves.

In the prior art, software-based solutions for dealing with signal loss can be found in so-called blind sensors, or with unclear sensor signals. US 2010/0235129 describes the correlation of signals from multiple sensors (sensor fusion), which allows the autonomous operation of a vehicle to be maintained even in the absence of non-assignable or inconclusive sensor signals.

DE 199 45 268 A1 describes a similar procedure and a device for detecting the sensor state with regard to contamination and blindness. These are cost-effective solutions because they are part of the electronic sensor intelligence.

In the prior art there is no teaching about dealing with the internal sensor correction of faults as a result of normal wear and tear of the sensor protection cover or other damage to it caused by external mechanical or weather-related action. The examples of sensor intelligence and sensor fusion cited can only eliminate the effect of signal loss in the sensor network, but not the cause of the signal failure, and thus an increased safety risk associated with autonomous driving remains.

The object of the present invention thus consisted in providing a sensor system for a motor vehicle, which in the event of contamination affecting the functioning of the sensor or locally limited damage to the sensor protection cover is automatically able to restore the functioning of the sensor without the sensor having to be replaced or repaired for this.

This object is achieved according to the invention with a movable deflection device for the signals emitted and to be received by the sensor, wherein in the event that a defect disturbs the incoming and/or outgoing signals this deflection device can be specifically reoriented so that the corresponding signal is directed past the defect. The movement of the deflection device can be carried out by a targeted lateral displacement and/or rotation, for example.

The invention thus relates to a sensor system for a vehicle, in particular a motor vehicle, comprising a sensor housing and an active or passive sensor contained therein with a sensor system based on radiation detection as well as a measuring device associated with the sensor, wherein the sensor housing has a signal-transmissive cover for the sensor on its side in the detection direction of the sensor and wherein the detection area of the sensor in the area of the signal-transmissive cover has a smaller extent than the signal-transmissive cover, wherein the sensor system is characterized in that the sensor is assigned a movable deflection device coupled with a control device for deflection of the radiation of the sensor, wherein the measuring device is designed in such a way that it is suitable to check in the detection area of the sensor whether and in which section the signal-transmissive cover has an area with reduced signal transmissivity, wherein the measuring device cooperates with the control device of the deflection device in such a way that the control device can change the position of the deflection device in such a way that the area with reduced signal transmissivity is outside the detection area of the sensor.

The basic idea of the invention is, among other things, that by means of the deflection device, for example a lateral offset beam replacement path for the sensor technology is set, with which the sensor beams can be passed by the area with reduced signal transmissivity.

According to a preferred embodiment of the sensor system according to the invention, the sensor is selected from radar sensors, light sensors, in particular lidar sensors based on lasers or light-emitting diodes and image acquisition sensors, as they are used for example in reversing, front or environment cameras.

The sensor can have a transmitting device and a separate receiving device.

The deflection device is preferably movable in all spatial directions, designed to be rotatable and/or tiltable about all axes. This allows the system to be adjusted very flexibly to bypass areas with reduced signal transmissivity and to maintain the function of the sensor. The deflection device may be attached to a suitable bracket or to a carriage, for example.

The movement of the deflection device can be carried out, for example, by at least one of an electric motor, a piezoelectric element, or a hydraulic element assigned to the deflection device.

The deflection device may further be fixed to the sensor housing, in particular between the signal-transmissive cover and the sensor. The fixing does not keep the deflection device stationary but is designed in such a way that it allows the aforementioned possibilities of adjustability. In particular, the movement of the deflection device by a belt drive, in particular a V-belt drive, a sliding carriage, a rotary device, such as a rotary plate or also in a gimbal suspension, can be carried out by means of suitable drives.

The deflection device may include at least one mirror, a prism, a compensation plate, a wedge window, a step lens, a blaze grating, a diffractive optical element, a holographic-optical element, or a combinations thereof.

The deflection device may be in one piece or even composed of at least two coupled deflection elements, wherein the at least two coupled deflection elements can be designed to be jointly or separately movable by the control device or at least one of the deflection elements is arranged to be stationary in the sensor system, wherein the stationary deflection element is preferably fixed on the inside of the signal-transmissive cover.

According to a preferred embodiment of the sensor system according to the invention, the deflection device is designed to be movable from a passive position outside the detection area of the sensor to an active position within the detection area of the sensor (102). As a result, the deflection device does not interfere with the operation of the sensor in the normal state, but in the event that the signal-transmissive cover has an area with reduced signal transmissivity in a section, it can be moved in the beam path of the sensor and thereby pass the sensor signal past the area with reduced signal transmissivity.

The deflection device can be designed to be controllable in such a way that pre-selected beam offset paths for the radiation wave detection or beam offset paths determined by self-calibration of the sensor (102) can be set.

The check of whether and in which section the signal-transmissive cover has an area with reduced signal transmissivity may in principle be carried out in any manner known to the person skilled in the art for this purpose, preferably by means of a computing unit assigned to the measuring device. For this purpose, the computing unit can be designed with a data processing program, by means of which the check of whether and in which section the signal-transmissive cover has an area with reduced signal transmissivity can be carried out by differential image recognition using the same sensor or different sensors, wherein in particular sensor fusion is used with the use of different sensors. A suitable method for sensor fusion is disclosed, for example, in US 2010/0235129 A.

Preferably, the control device is designed in such a way that after a change of position of the deflection device it passes this new position to the on-board network of the vehicle, so that a conversion of the data supplied by the sensor can be carried out there in such a way that the new beam path is included as a correction variable compared to the original beam path. The conversion can also be carried out in the computing unit of the sensor system, so that position-corrected signals can already be sent from the sensor system to the on-board network of the vehicle.

The measuring device and the control device can be positioned mutually independently inside or outside the sensor housing. In some cases, it may be preferred to arrange the measuring device and the control device within the sensor housing because this makes the entire unit one component and apart from the energy supply and the connection to the data network of the vehicle no additional lines which could possibly lead to leakage problems have to be passed through the sensor housing.

According to a preferred embodiment of the sensor system according to the invention, the measuring device is designed so that it can output an error signal in the event that the position of the deflection device cannot be changed in such a way that the area with reduced signal transmissivity is outside the detection area of the sensor. This error signal may be forwarded to the on-board electronics of the vehicle, where it may trigger an error code indicating the need to replace the sensor and/or its improper functioning so that the vehicle user does not rely on a defective sensor and there is thus damage to the vehicle or the like.

The sensor system is further preferably designed in such a way that the check of whether and in which section the signal-transmissive cover has an area with reduced signal transmissivity can be carried out when switching on the sensor system and/or at freely selectable time intervals. This ensures that the sensor is checked at regular intervals and that its functionality is ensured.

The sensor system according to the invention may further be designed so that a signal-transmissive inner protective cover which preferably extends to the lateral inner walls of the housing cover is provided between the sensor and the signal-transmissive cover. In this way, the internal sensor can remain protected from harmful influences even if the signal-transmissive cover has a crack or a hole, for example.

The signal-transmissive cover and/or the signal-transmissive inner protective cover may be constructed of a transparent plastic or glass, wherein the transparent plastic is in particular selected from polycarbonate, polymethyl methacrylate, polyethylene terephthalate, cellulose triacetate, amorphous polyamide, cycloolefin polymer, cycloolefin copolymer, polyethylene, polypropylene, polyvinyl alcohol or from mixtures or copolymers thereof. Particularly preferred here due to their optical and mechanical properties are polycarbonate and polymethyl methacrylate, especially polycarbonate because of the extremely tough behavior.

Another object of the present invention relates to a method for operating a sensor system for a motor vehicle comprising a sensor housing and an active or passive sensor contained therein with a radiation detection-based sensor and a measuring device associated with the sensor, wherein the sensor housing has a signal-transmissive cover for the sensor on its side in the detection direction of the sensor and wherein the detection area of the sensor has a smaller extent than the signal-transmissive cover in the area of the signal-transmissive cover, wherein the method is characterized in that the sensor is assigned a movable deflection device coupled with a control device for deflection of the radiation of the sensor, wherein by means of the measuring device a check is carried out of whether and in which section of the detection area of the sensor the signal-transmissive cover has an area with reduced signal transmissivity, and if an area with reduced signal transmissivity is detected, the position of the deflection device is varied by means of the control device in such a way that the area with reduced signal transmissivity is outside the detection area of the sensor.

According to a preferred development of the method according to the invention, an area with reduced signal transmissivity is defined in that in a contiguous area of at least 1% of the detection area of the sensor on the signal-transmissive cover a damping of the signal to be detected by the sensor system of at least 5% occurs compared to the remaining area of the signal-transmissive cover in the detection area of the sensor.

The invention further relates to a vehicle, in particular a motor vehicle, which is equipped with at least one sensor system according to the invention. The sensor system can be used, for example, in the front, rear or side area of a vehicle, for example in the bumper, radiator grille, headlights, front panel, rear panel, rear light, roof pillar, screen or attachment, such as exterior mirrors. The sensor system can be installed in an opening of a body outer part. Preferably, the sensor system is seamlessly integrated into the surface of the vehicle part. Particularly preferably, the outer body part is also the sensor protection cover at the same time. The positioning of the sensors behind body components has several advantages over free-standing sensors, especially aesthetic, aerodynamic and repair advantages. Sensor systems with a so-called ADAS (=Advanced Driver Assistance Systems) are particularly suitable for consideration. These are, for example, lidar sensors, scanning lidar sensors, flash lidar sensors, GHz, and THz radars for near-field to remote field detection, cameras for the visible or infrared wavelength spectrum. A possible preferred application is 360° surround detection for highly automated and autonomous driving. Another application area: These ADAS sensors can provide relevant comfort functions for the end customer, for example mechatronic comfort functions such as systems for contact-free opening and closing of doors and tailgates, or for example light-based and display-based comfort functions.

The invention relates in particular to the following embodiments:

According to a first embodiment, the invention relates to a sensor system 200, 300 for a vehicle, in particular a motor vehicle, comprising a sensor housing and an active or passive sensor 102 arranged therein with sensor technology based on radiation detection and a measuring device assigned to the sensor 102, wherein the sensor housing has a signal-transmissive cover 106 for the sensor 102 on its side in the detection direction of the sensor 102 and wherein the detection area of the sensor 102 in the area of the signal-transmissive cover 106 has a smaller extent than the signal-transmissive cover 106, wherein the sensor system 200, 300 is characterized in that the sensor 102 is assigned a movable deflection device 201 coupled with a control device for deflection of the radiation of the sensor 102, wherein the measuring device is designed in such a way that it is suitable, in the detection area of the sensor 102, to check whether and in which section the signal-transmissive cover 106 has an area with reduced signal transmissivity 202, 302, wherein the measuring device cooperates with the control device of the deflection device 201 in such a way that the control device can change the position of the deflection device 201 in such a way that the area with reduced signal transmissivity 202, 302 is outside the detection area of the sensor 102, wherein the deflection device (201) is made of at least two coupled deflection elements (201a, 201b, 301a, 301b) and the deflection device (201) or at least one of the deflection elements (201a, 201b, 301a, 301b) can be moved from a passive position outside the detection area of the sensor (102) to an active position within the detection area of the sensor (102).

According to a second embodiment, the invention relates to a sensor system according to embodiment 1, characterized in that the sensor 102 is selected from radar sensors, light sensors, in particular lidar sensors based on lasers or light-emitting diodes and image acquisition sensors.

According to a third embodiment, the invention relates to a sensor system according to embodiment 1 or 2, characterized in that the sensor 102 has a transmitting device and a separate receiving device.

According to a fourth embodiment, the invention relates to a sensor system according to one of the preceding embodiments, characterized in that the deflection device 201 can be moved in all spatial directions and is designed to be rotatable and/or tiltable about all axes.

According to a fifth embodiment, the invention relates to a sensor system according to one of the preceding embodiments, characterized in that the deflection device 201 is assigned at least an electric motor, a piezoelectric element, or a hydraulic element for the movement thereof.

According to a sixth embodiment, the invention relates to a sensor system according to one of the preceding embodiments, characterized in that the deflection device 201 is fixed to the sensor housing, in particular between the signal-transmissive cover 106 and the sensor 102.

According to a seventh embodiment, the invention relates to a sensor system according to one of the preceding embodiments, characterized in that the deflection device 201 comprises at least one mirror, a prism, a compensation plate, a wedge window, a step lens, a blaze grating, a diffractive optical element, a holographic-optical element or combinations thereof.

According to an eighth embodiment, the invention relates to a sensor system according to one of the preceding embodiments, characterized in that the at least two coupled deflection elements 201a, 201b, 301a, 301b are arranged to be movable jointly or separately by the control device or at least one of the deflection elements 201a, 201b, 301a, 301b is stationary in the sensor system.

According to a ninth embodiment, the invention relates to a sensor system according to the eighth embodiment, characterized in that the at least two coupled deflection elements (201a, 201b, 301a, 301b) are designed to be only jointly movable by the control device and at least one of the deflection elements (201a, 201b, 301a, 301b) is fixed in the sensor system, wherein the stationary deflection element (301b) is fixed on the inside of the signal-transmissive cover (106).

According to a tenth embodiment, the invention relates to a sensor system according to one of the preceding embodiments, characterized in that the deflection device 201 can be controlled so that preselected beam offset paths can be set for radiation detection or beam offset paths determined by self-calibration of the sensor 102 can be set for radiation detection.

According to an eleventh embodiment, the invention relates to a sensor system according to one of the preceding embodiments, characterized in that the check of whether and in which section the signal-transmissive cover 106 has an area with reduced signal transmissivity 202, 302 can be carried out by means of a computing unit assigned to the measuring device, wherein the computing unit is in particular operated with a data processing program, by means of which the check of whether and in which section the signal-transmissive cover 106 has an area with reduced signal transmissivity 202, 302 is carried out by differential image detection using the same sensor 102 or different sensors, wherein sensor fusion is preferably used when using different sensors.

According to a twelfth embodiment, the invention relates to a sensor system according to one of the preceding embodiments, characterized in that the measuring device and the control device are positioned independently of each other inside or outside the sensor housing.

According to a thirteenth embodiment, the invention relates to a sensor system according to one of the preceding embodiments, characterized in that the measuring device is designed in such a way that it can output an error signal in the event that the position of the deflection device 201 cannot be changed in such a way that the area with reduced signal transmissivity 202, 302 is outside the detection area of the sensor 102.

According to a fourteenth embodiment, the invention relates to a sensor system according to one of the preceding embodiments, characterized in that the sensor system 200, 300 is designed in such a way that the check of whether and in which section the signal-transmissive cover 106 has an area with reduced signal transmissivity 202, 302 can be carried out on switching on the sensor system 200, 300 and/or at freely selectable time intervals.

According to a fifteenth embodiment, the invention relates to a sensor system according to one of the preceding embodiments, characterized in that a signal-transmissive inner protective cover which preferably extends to the lateral inner walls of the housing cover is provided between the sensor 102 and the signal-transmissive cover 106, wherein the deflection device is particularly preferably located between the inner protective cover and the sensor 102.

According to a sixteenth embodiment, the invention relates to a sensor system according to one of the preceding embodiments, characterized in that the signal-transmissive cover 106 and/or the signal-transmissive inner protective cover 302 are constructed of a transparent plastic or glass, wherein the transparent plastic is in particular selected from polycarbonate, polymethyl methacrylate, polyethylene terephthalate, cellulose triacetate, amorphous polyamide, cycloolefin polymer, cycloolefin copolymer, polyethylene, polypropylene, polyvinyl alcohol or from mixtures or copolymers of these, wherein the transparent plastic is preferably polycarbonate or polymethyl methacrylate.

According to a seventeenth embodiment, the invention relates to a method for operating a sensor system 200, 300 for a motor vehicle comprising a sensor housing and an active or passive sensor 102 arranged therein with sensor technology based on radiation detection and a measuring device assigned to the sensor 102, wherein the sensor housing has a signal-transmissive cover 106 for the sensor 102 on its side in the detection direction of the sensor 102 and wherein the detection area of the sensor 102 in the area of the signal-transmissive cover 106 has a smaller extent than the signal-transmissive cover 106, wherein the method is characterized in that the sensor 102 is assigned a movable deflection device 201 coupled with a control device for deflection of the radiation of the sensor 102, wherein by means of the measuring device a checked is carried out of whether and in which section of the detection area of the sensor 102 the signal-transmissive cover 106 has an area with reduced signal transmissivity 202, 302, and if an area with reduced signal transmissivity 202, 302 is detected, the position of the deflection device 201 is changed by means of the control device in such a way that the area with reduced signal transmissivity 202, 302 is outside the detection area of the sensor 102, wherein the deflection device (201) is composed of at least two coupled deflection elements (201a, 201b, 301a, 301b) and the deflection device (201) or at least one of the deflection elements (201a, 201b, 301a, 301b) can be moved from a passive position outside the detection area of the sensor (102) to an active position within the detection area of the sensor (102).

According to an eighteenth embodiment, the invention relates to a method according to embodiment 17, characterized in that an area with reduced signal transmissivity 202, 302 is defined in that in a contiguous area of at least 1% of the detection area of the sensor 102 on the signal-transmissive cover 106 attenuation of the signal to be detected by the sensor system of at least 5% occurs compared to the remaining area of the signal-transmissive cover 106 in the detection area of the sensor 102.

According to a nineteenth embodiment, the invention relates to a vehicle, in particular a motor vehicle, which is equipped with at least one sensor system 200, 300 according to one of the embodiments 1 to 16.

Figure 2A:
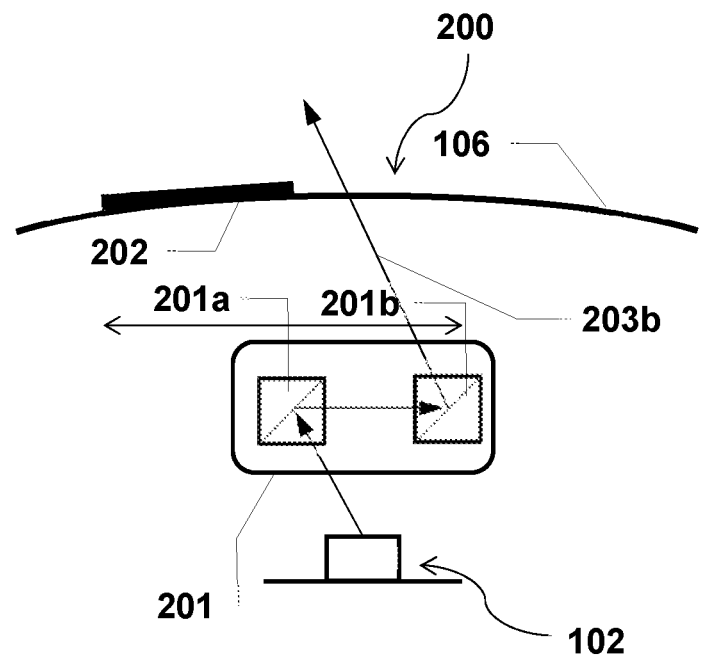
Figure 3A:
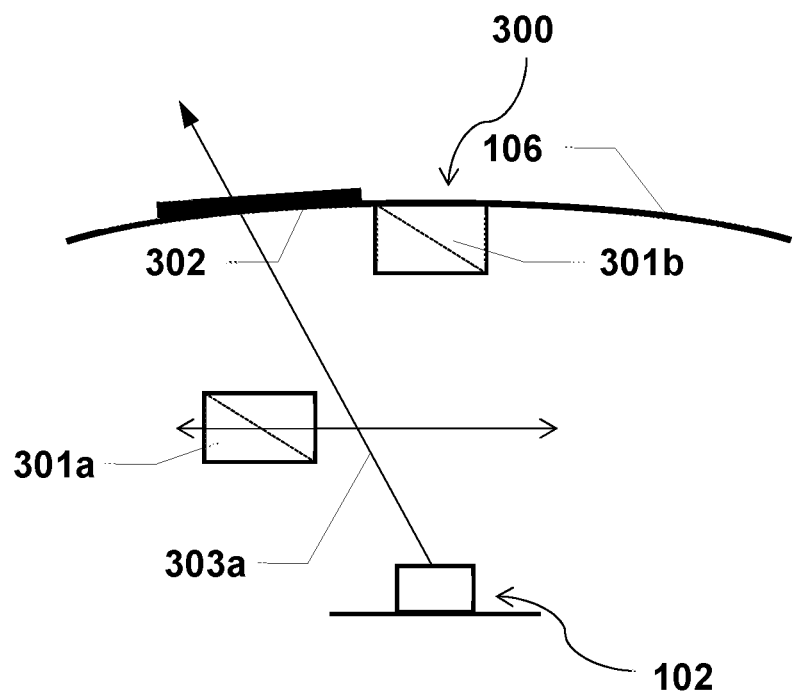

The invention is explained in more detail based on FIGS. 1 to 3b. In the figures, FIG. 1 shows a schematic sensor structure according to the prior art;

FIG. 2a/b shows a sensor according to the invention with a movable deflection device in two positions, (2a) distorted sensor signal, (2b) undistorted sensor signal after deflection of the signal by the deflection device and FIG. 3a/b shows another embodiment according to the invention with spatially separated deflection units in two positions, (3a) distorted sensor signal, (3b) undistorted sensor signal after deflection of the signal by the deflection device.

In FIG. 1, a sensor system 101 for a motor vehicle is schematically shown in a lateral sectional representation. The sensor system 101 is a lidar sensor. The sensor system 101 comprises a sensor housing 110 and a sensor 102 arranged therein consisting of a transmitter 103 and a receiver 104 with a detection angle 107 which is defined by the detection area 108, 109. The sensor 102 is designed in the present case as a laser sensor with flight time measurement. A measuring device 105 is assigned to the sensor 102 for processing the sensor signals. The sensor housing 110 has a signal-transmissive cover 106 for the sensor 102 on its side located in the detection direction of the sensor.

FIG. 2a depicts a sensor system 200 according to the invention. This includes a horizontally movable deflection device 201 with two deflection elements 201a and 201b, with which the signal path of the sensor 102 can be changed as soon as signal-impairing damage 202 is detected on the signal-transmissive cover 106 of polycarbonate, which affects a first part 203a of the detection area of the sensor 102, so that the sensor 102 can only send or receive signals in a second subsection. The deflection device 201 is located here in a passive position, i.e. outside the transmitting and receiving area of the sensor 102.

Figure 2B:
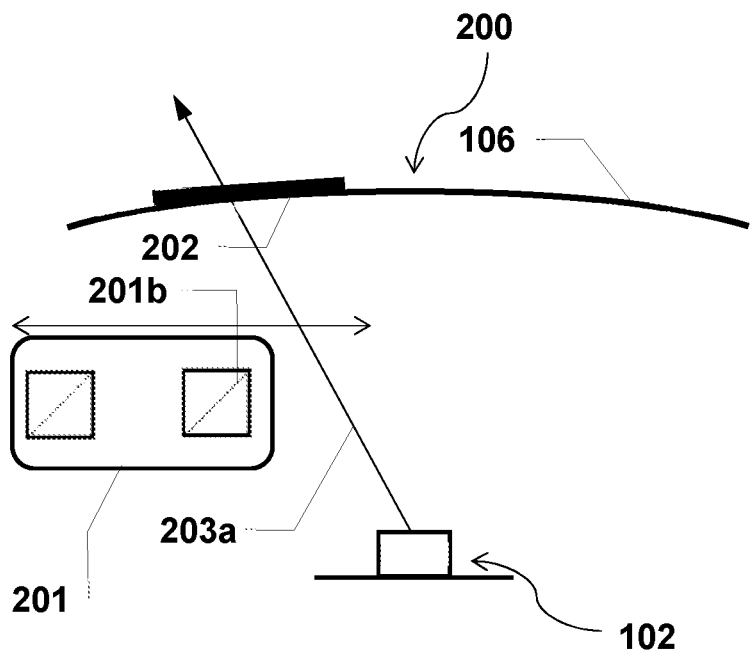

In FIG. 2b the sensor system 200 from FIG. 2a is shown after the deflection device 201 has been moved horizontally into such an area that the signal path 203b of the sensor 102 passes by the damage 202, so that the sensor 102 is functional again over its entire detection angle.

Figure 3B:
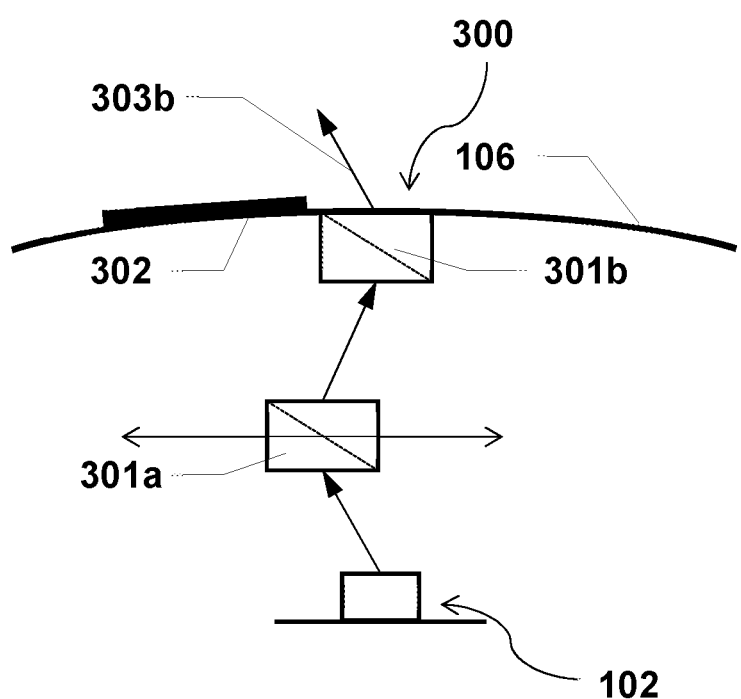

FIGS. 3a and 3b show a further embodiment of a sensor system 300 according to the invention. The main difference is that the sensor system 300 shown here is equipped with a spatially separated deflection device, which has a movable first deflection element 301a and a stationary second deflection element 301b attached to the inside of the signal-transmissive cover 106. The first deflection element 301a and the second deflection element 301b together thus form the deflection device. In FIG. 3a, the first deflection element 301a is in a passive position, i.e. outside the radiation and receiving range of the sensor 102. The signal path 303a of the sensor 102 is disturbed here by signal-impairing damage 302.

In FIG. 3b, the movable first deflection element 301a was moved from its passive position to an active position, i.e. in the signal path of the sensor 102. As a result, a new signal path 303b is set, so that the signal is moved past the signal-impairing damage 302 via the movable first deflection element 301a and the stationary second deflection element 301b.

REFERENCE CHARACTER LIST 101 sensor system (prior art)
102 sensor
103 transmitter
104 receiver
105 measuring device
106 signal-transmissive cover
107 detection angle
108 detection area
109 detection area
110 sensor housing
200 sensor system (invention)
201 horizontally movable deflection device
201a first deflection element
201b second deflection element
202 signal-impairing damage
203a disturbed signal path
203b undisturbed signal path
300 sensor system (invention)
301a movable deflection element
301b second, fixed deflection element
302 signal-impairing damage
303a disturbed signal path
303b undisturbed signal path

The invention claimed is:

1. A sensor system for a vehicle, comprising a sensor housing and an active or passive sensor arranged therein with sensor technology based on radiation detection and a measuring device assigned to the sensor, wherein the sensor housing has a signal-transmissive cover for the sensor on its side located in the detection direction of the sensor and wherein the detection area of the sensor in the area of the signal-transmissive cover has a smaller extent than the signal-transmissive cover, wherein the sensor is assigned a movable deflection device coupled to a control device for deflection of the radiation of the sensor, wherein the measuring device is designed in such a way that it is suitable to check in the detection area of the sensor whether and in which section the signal-transmissive cover has an area with reduced signal transmissivity, wherein the measuring device cooperates with the control device of the deflection device in such a way that the control device can change the position of the deflection device in such a way that the area with reduced signal transmissivity is outside the detection area of the sensor, wherein the deflection device is composed of at least two coupled deflection elements, wherein the at least two coupled deflection elements can only be moved jointly by the control device and at least one of the deflection elements is arranged fixed in the sensor system, wherein the fixed deflection element is attached to the inside of the signal-transmissive cover, and wherein the deflection device or at least one of the deflection elements can be moved from a passive position outside the detection area of the sensor to an active position within the detection area of the sensor.

2. The sensor system of claim 1, wherein the sensor is selected from radar sensors, light sensors, lidar sensors based on lasers or light-emitting diodes and image acquisition sensors.

3. The sensor system of claim 1, wherein the sensor has a transmitting device and a separate receiving device.

4. The sensor system of claim 1, wherein the deflection device is designed to be movable in all spatial directions, and rotatable or tiltable about all axes.

5. The sensor system of claim 1, wherein the deflection device is assigned at least one electric motor, a piezoelectric element, or a hydraulic element for the movement thereof.

6. The sensor system of claim 1, wherein the deflection device is fixed to the sensor housing.

7. The sensor system of claim 1, wherein the deflection device comprises at least one mirror, a prism, a compensation plate, a wedge window, a step lens, a blaze grating, a diffractive optical element, a holographic-optical element, or combinations thereof.

8. The sensor system of claim 1, wherein the check of whether and in which section the signal-transmissive cover has an area with reduced signal transmissivity can be carried out by means of a computing unit assigned to the measuring device, wherein the computing unit is operated with a data processing program, by means of which the check of whether and in which section the signal-transmissive cover has an area with reduced signal transmissivity is carried out by differential image detection using the same sensor or different sensors, wherein sensor fusion is used when using different sensors.

9. The sensor system of claim 1, wherein the measuring device and the control device are positioned independently of each other inside or outside the sensor housing.

10. The sensor system of claim 1, wherein the measuring device is designed in such a way that it can output an error signal in the event that the position of the deflection device cannot be changed in such a way that the area with reduced signal transmissivity is outside the detection area of the sensor.

11. The sensor system of claim 1, wherein the sensor system is designed in such a way that the check of whether and in which section the signal-transmissive cover has an area with reduced signal transmissivity can be carried out when switching on the sensor system or at freely selectable time intervals.

12. The sensor system of claim 1, wherein the signal-transmissive cover is constructed of a transparent plastic or glass.

13. A vehicle equipped with at least one sensor system of claim 1.

14. The sensor system of claim 1, wherein the deflection device is fixed between the signal-transmissive cover and the sensor.

15. The sensor system of claim 12, wherein the transparent plastic is selected from polycarbonate, polymethyl methacrylate, polyethylene terephthalate, cellulose triacetate, amorphous polyamide, cycloolefin polymer, cycloolefin copolymer, polyethylene, polypropylene, polyvinyl alcohol or from mixtures or copolymers of these.

16. A method for operating a sensor system for a motor vehicle comprising a sensor housing and an active or passive sensor arranged therein with sensor technology based on radiation detection and a measuring device assigned to the sensor,
    wherein the sensor housing has a signal-transmissive cover for the sensor on its side located in the detection direction of the sensor and wherein the detection area of the sensor in the area of the signal-transmissive cover has a smaller extent than the signal-transmissive cover,
    wherein a movable deflection device coupled to a control device is assigned to the sensor for deflection of the radiation of the sensor, wherein the measuring device is used to check whether and in which section of the detection area of the sensor the signal-transmissive cover has an area with reduced signal transmissivity, and if an area with reduced signal transmissivity is detected, the position of the deflection device is changed by means of the control device in such a way that the area with reduced signal transmissivity is outside the detection area of the sensor,
    wherein the deflection device is composed of at least two coupled deflection elements, wherein the at least two coupled deflection elements can only be moved jointly by the control device and at least one of the deflection elements is arranged fixed in the sensor system, wherein the fixed deflection element is attached to the inside of the signal-transmissive cover, and
    wherein the deflection device or at least one of the deflection elements can be moved from a passive position outside the detection area of the sensor to an active position within the detection area of the sensor.

17. The method of claim 16, an area with reduced signal transmissivity is defined in that attenuation of the signal to be detected by the sensor system of at least 5% occurs in a contiguous area of at least 1% of the detection area of the sensor on the signal-transmissive cover compared to the remaining area of the signal-transmissive cover in the detection area of the sensor.

\* \* \* \* \*